July 28, 1964 J. MÜHLBEYER 3,142,202
TWO MOTOR DRIVE HAVING A CENTRIFUGALLY CONTROLLED CLUTCH
Filed Dec. 19, 1962 2 Sheets-Sheet 1

July 28, 1964 J. MÜHLBEYER 3,142,202
TWO MOTOR DRIVE HAVING A CENTRIFUGALLY CONTROLLED CLUTCH
Filed Dec. 19, 1962 2 Sheets-Sheet 2

United States Patent Office 3,142,202
Patented July 28, 1964

3,142,202
TWO MOTOR DRIVE HAVING A CENTRIFUGALLY
CONTROLLED CLUTCH
Josef Mühlbeyer, Hohemarkstr. 25, Oberursel, Germany
Filed Dec. 19, 1962, Ser. No. 245,747
Claims priority, application Germany June 29, 1962
14 Claims. (Cl. 74—665)

My invention relates to a clutch releasable for automatic free-wheeling operation under control by centrifugal motion of fly weights at high rotary speed, and will be described herein with reference to its preferred though not exclusive use in electrically driven laundering appliances.

There are automatic appliances in which a rotatable laundry-receiving drum is selectively driven, under control by a timer or programming device, from a motor of relatively low speed for washing operation, and from a high-speed motor for spin-drying. An endless transmission belt connects a sheave on the shaft of the low-speed motor with a belt sheave of larger diameter on the shaft of the high-speed motor. The latter shaft carries another sheave which is connected by another endless belt with a sheave on the shaft of the drum. Only one of the respective motors drives the drum at a time, while the idle motor is being dragged along. When the low-speed motor for washing operation is in operation, no appreciable disadvantages are encountered by the entrainment of the high-speed motor then electrically switched off. However, when the high-speed motor for spin-drying is switched on, the intermediate belt transmissions cause the other motor to run at a speed much higher than corresponds to its normal operation and amounting to a multiple of the speed at which the high-speed motor is operating. This imposes considerable wear upon the bearings and greatly increases the operating noise.

To avoid these disadvantages, the low-speed motor for washing operation has been equipped with a centrifugal free-wheeling connection, and the high-speed motor for spin-drying has been equipped with a centrifugal clutch. This prevents the motor for washing operation from being entrained at a multiple speed of the spin-drying motor. However, since in the free-wheeling clutches employed, the torque transmission is effected by fly weights acting in opposition to springs that tend to hold a friction lining against friction surfaces, a relatively high spring force is needed. The correspondingly large friction resistance occurring in such a clutch causes a large amount of wear at the clutch components frictionally engaging each other, thus demanding disagreeably frequent maintenance or replacement work.

For example, for transmitting a torque of 1 mkg. with a friction-disc of about 70 mm. diameter, a spring force of approximately 100 kg. is required. To overcome such a spring force by centrifugal force, it is necessary to either operate with high rotating speeds or to employ heavy fly weights. High rotating speeds are not desirable because they would again cause the entrained motor for washing operation to run at excessively high speed when the spin-dry motor is switched on. Heavy fly weights are also undesirable because they result in excessive wear at the bearings, particularly in the smaller motor used for washing operation.

It is an object of my invention to devise a centrifugally controlled free-wheeling clutch which obviates disadvantages of the above-mentioned kind and which reliably affords selectively connecting two motors of respectively different speeds with a single driven member without resulting in excessive speed of the low-speed motor when the latter is being idly dragged along, thus reducing the wear in the bearings, and which at the same time eliminates or greatly minimizes the occurrence of frictional wear in such components as friction or brake linings.

To this end, and in accordance with one of the features of my invention, relating to a centrifugal clutch generally of the type mentioned above, the force-transmitting connection between the driving clutch member and the driven member is effected by a centrifugal-force controlled catch or latch engagement, as contrasted to a frictional entrainment. Furthermore, according to another feature of my invention, subsidiary to the one mentioned, the entrainment of the driven clutch member, when catch-connected with the driving member is effected by a pulling force.

These and more specific features of my invention, said features being set forth with particularity in the claims annexed hereto, as well as the above-mentioned objects and advantages of the invention, will be apparent from, and will be described in, the following with reference to the embodiments of clutches according to the invention illustrated by way of example on the accompanying drawings in which:

Figure 1:
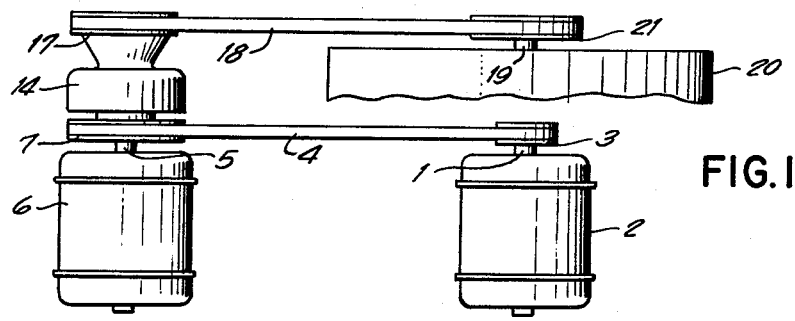
FIG. 1 shows schematically a driving arrangement involving two selectively operable drives of respectively different speed acting on a clutch having a single driven output member.
Figure 2:
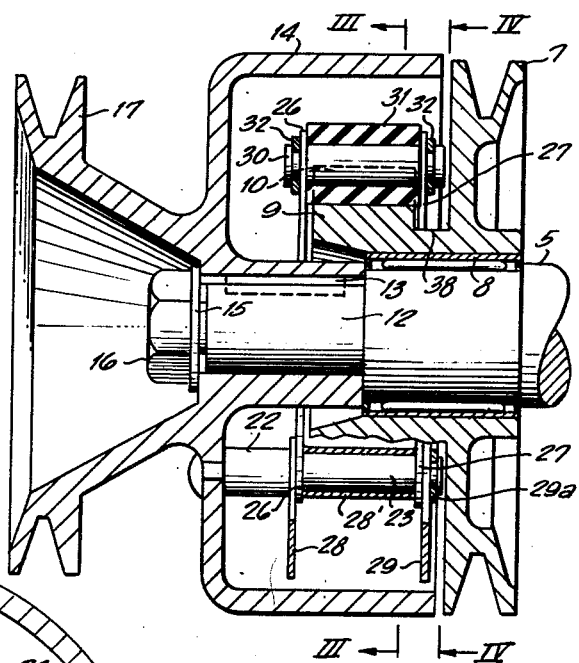
FIG. 2 is an axial section of a clutch as shown in FIG. 1, the section being taken along the line II—II in FIG. 3.
Figure 3:
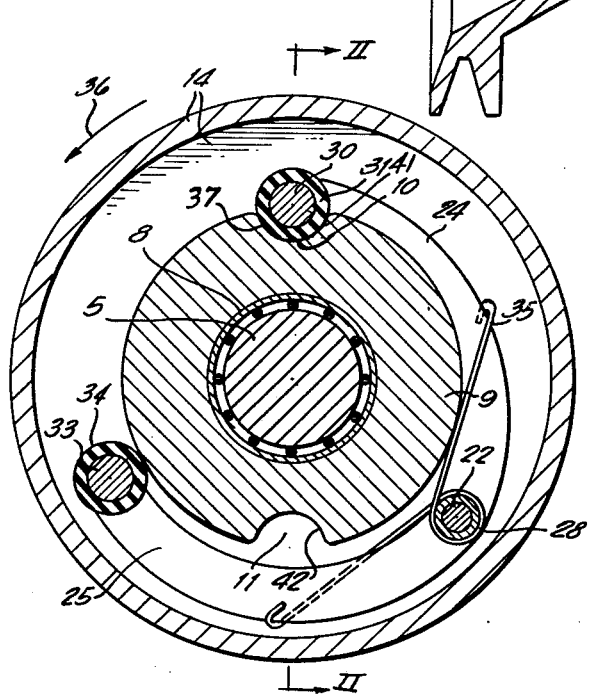
FIG. 3 is a cross section of the same clutch, taken along the line III—III in FIG. 2.

According to FIG. 1, the shaft 1 of a motor 2 carries a V-belt sheave 3. The motor 2 operates at relatively low speed for rotating the laundry-receiving drum 20 of an automatic laundering appliance at the speed required for washing operation. The low-speed motor 2 is started and stopped by a timer or program device (not illustrated) and may also reverse its running directions in predetermined intervals of time during the operating sequence of the appliance. The sheave 3 is connected by an endless V-belt 4 with a sheave 7 of larger diameter rotatably seated on the shaft of a motor 6 operating at higher speed for driving the drum 20 during spin-drying operation, the motor 6 being also controlled by the above-mentioned timer so that only one of the two motors 2 or 6 is switched on at a time. The sheave 7 is journalled on the shaft 5 of motor 6 by means of a needle bearing 8 (FIG. 2) and its hub carries a circular disc or plate member 9. Preferably the belt sheave 7 and its hub, as well as the disc member 9, consist of a single integral piece as shown in FIG. 2. The disc 9 is provided with catch recesses. Preferably two such recesses 10 and 11 (FIG. 3) are located on diametrically opposite sides. The purpose of these recesses will be described in a later place.

The shaft 5 of the high-speed motor 6 has a stepped-down end portion 12 on which a cup-shaped carrier 14 is mounted. A key 13 prevents the carrier 14 from rotating relative to the motor shaft 5. A screw bolt 16 whose head rests against a washer 15 forces the carrier 14 against the annular shoulder of the shaft formed by the end 12, thus rigidly securing the carrier 14 to the shaft 5. A V-belt sheave 17, which constitutes the output member of the clutch, is joined with the carrier 14, consisting preferably of a single piece therewith. The sheave 17 drives by means of an endless belt 18 a sheave 21 fastened on the shaft 19 of the laundering drum 20.

Fastened to the carrier 14 is a pivot pin 22 (FIGS. 2, 3) whose axis is radially spaced from the axis of the motor shaft 5 and extends parallel thereto. The pin 22 has a stepped-down pivot portion 23 on which two fly-weight bodies 24 and 25 (FIG. 3) are pivotally mounted. The fly weight 24 comprises two parallel arms 26, 27 (FIG. 2) and the fly weight 25 also comprises two arms 28 and 29. The two arms 26 and 27 of fly weight 24 are firmly connected with each other by a sleeve 28. A lock washer 29a holds the fly weights 24 and 25 on the pivot portion 23 of pin 22. Secured between the free ends of the arms 26 and 27 is a journal pin 30 on which a clutch roller 31, for example of rubber or synthetic plastic, is fastened and secured by means of lock washers 32. A corresponding journal pin is rotatably mounted between the two arms 28 and 29 of fly weight 25 and carries a second coupling roller 34 fastened by lock washers (not illustrated) on the journal pin 33.

The two fly weights extend from the common pivot pin 22 in opposite peripheral directions. A wire spring 35 which has a number of helical turns surrounding the pivot pin 28 and whose respective legs engage the two fly weights, normally holds one of the two rollers 31, 34 in clutching engagement with one of the catch recesses 10, 11 of the catch member 9, whereas the other roller is then forced against the peripheral cam contour of the member 9. The spring 35 serves only the purpose of maintaining the clutching engagement between the one roller 31 or 34 that, at any time, is in engagement with one of the respective catch recesses 10 and 11, or for causing the other roller to catch into one of the recesses when the belt sheave 7 reverses its direction of rotation. Consequently, the spring 35 can be given relatively low strength, since it does not directly participate in the transmission of driving torque or in the production of torque-transmitting friction.

The catch recesses 10 and 11 in catch member 9 of belt sheave 7 are preferably given a semicircular cross-sectional shape and extend approximately over one-half of the periphery of rollers 31, 34.

When after starting of the laundering appliance the belt sheave 7 is driven by motor 2 for washing operation in the direction of the arrow 36 (FIG. 3), the catch member 9 is entrained in the same direction. This is due to the force-constrained connection between the fly-weight carrier 14 and the catch member 9 effected by the driving flank 41 of the recess 10 acting upon the clutch roller 31 of fly weight 24. Consequently, the sheave 17 (FIG. 2) is, in effect, fixedly joined with the sheave 7 and thus drives the laundering drum 20 by means of the transmission belt 18, while the electrically idle motor 6 for spin-drying is taken along at the same, relatively low speed.

When after a given interval of time the automatic timer of the appliance reverses the running direction of the motor 2 in further performance of the washing operation, the sheave 7 with catch member 9 (FIG. 3) rotates in the direction opposed to that of the arrow 36. Now the roller 31 of fly weight 24 is forced out of the recess 10 by the action of the flank 37 in opposition to the force of the biasing spring 35, and the roller 31, during further rotation of catch member 9, then rolls along the periphery of member 9 until the roller 34 of the other fly weight 25 drops into the catch recess 11 of member 9 under the biasing force of spring 35. From then on, the fly-weight carrier 14 is entrained by the flank 42 of recess 11 acting upon the clutch roller 34 of fly weight 25, and now turns in the direction opposed to that of arrow 36. It will be noted that in both running directions the entraining force is transmitted from the one effective clutch roller to the pivot pin 22 and thus to the carrier 14 and the sheave 17 by pulling force acting in the respective arms of the fly-weight structures 24 or 25. Consequently, the entrainment does not involve a frictional transmission of torque as is the case in the known clutches of this general type, so that in the event of disturbance the clutch according to the invention is not endangered by occurrence of excessive frictional heat or slippage.

When after termination of the washing operation the high-speed motor 6 for spin-drying is switched on while the low-speed motor 2 is deenergized, the still persisting force-constrained connection between the catch member 9 of sheave 7 and one of the fly weights 24, 25 causes the motor 2 to continue running until the high-speed motor 6 and the fly-weight carrier 14 have reached a given speed higher than the rated speed of the motor 2. When this speed is exceeded, the fly weights 24 and 25 pivoted to the carrier 14 are flung outwardly about the pivot pin 23 in opposition to the force of spring 35. The clutch roller previously engaged in one of the catch recesses, for example the roller 31 engaged in recess 10 of catch member 9, is then moved out of engagement by the centrifugal motion of the fly weight 24, and the other clutch roller 34 is lifted by fly weight 25 away from the peripheral surface of the catch member. As a result, the driving connection between sheave 7 and carrier 14 is interrupted and the clutch becomes free wheeling. This has the consequence that the motor 2 for the washing operation is no longer dragged along by the motor 6 for spin-drying operation. The laundering drum 20 is now driven at high speed for spin-drying exclusively from the shaft 5 of motor 6 through the fly-weight carrier 14, the belt sheave 17, the belt 18 and the sheave 21.

Figure 3A:
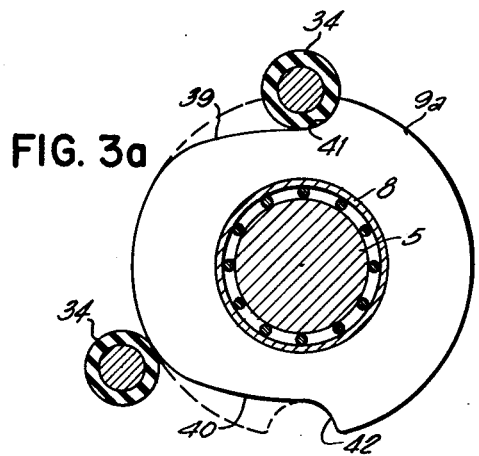
FIGS. 3a, 3b show two different modifications of a component applicable in lieu of the corresponding clutch component according to FIG. 3.
Figure 3B:
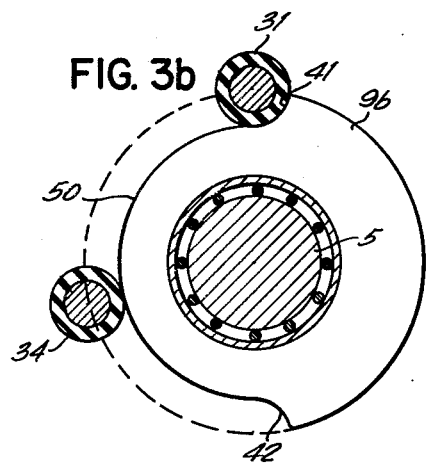

Instead of giving the catch recesses 10 and 11 in member 9 a semicircular cross-sectional shape, they may also be widened toward their respective inactive sides. Thus, according to FIG. 3a, the two recesses in catch member 9a, otherwise corresponding to FIG. 3, have each an active coupling flank 41, 42 extending over a circular arc of 90°, whereas the opposite side merges with the periphery of member 9 along a gradual merger curve 39 or 40. In the modification shown in FIG. 3b, the catch member 9b has the respective inactive sides of the two recesses joined with each other so that they form together a single wide recess extending over approximately one-half of the entire periphery. During active clutching operation and entrainment, the modifications according to FIGS. 3a and 3b operate in the same manner as described above with reference to FIG. 3, but when the catch member 9a, 9b reverses its direction of rotation, the previously active roller glides more easily out of clutching engagement.

Figure 4:
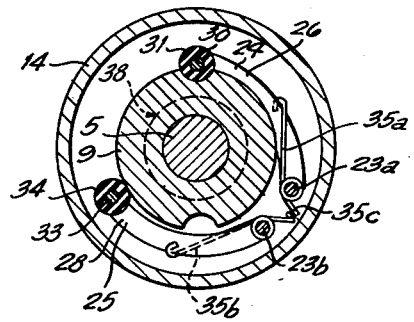
FIG. 4 illustrates a modified clutch by a cross section generally corresponding to that of FIG. 3.

While in the embodiments so far described the fly weights are mounted on a single pivot pin 22 (FIG. 2), each fly weight may also be given its own mounting or pivot pin with respect to the fly-weight carrier 14. Thus in the modification shown in FIG. 4, the two fly weights 24 and 25 are pivoted on respective pivot pins 23a and 23b separately from each other and are each provided with its own biasing spring 35a, 35b. Each spring has helical turns seated on the appertaining pivot pin and has a leg engaging the appertaining fly weight, whereas the other leg abuts against a stop 35c fastened to the carrier 14.

Figure 5:
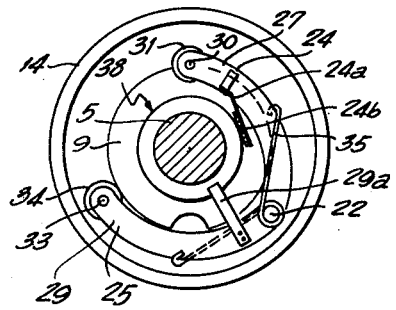
FIG. 5 shows a part-sectional view of still another modified clutch, the view being from the right of FIG. 2.

To reliably secure gradual clutching performance and avoid any danger of jarring when switching from motor 6 for spin-drying to motor 2 for washing operation, provision can be made for inserting a temporarily active frictional and elastic connection between the catch member and the flyweight carrier. For example, a spring member, such as a leaf spring with a friction lining, can be attached to the arm 27 of fly weight 24 and to the arm 29 of the fly weight 25. In FIG. 5, the respective leaf springs are denoted by 24a and 29a. The friction lining of spring 24a is denoted by 24b. It rests against the peripheral surface of the hub portion 38 that joins the belt sheave 7 with the catch member 9 (FIG. 2). The leaf spring 29a is shown to extend laterally of the catch member 9. The friction lining (not visible in FIG. 5)

of leaf spring 29a thus rests against the lateral surface of member 9. While both types of frictional devices can be employed in the same clutch as shown in FIG. 5, it is preferable to use only one of the two types in one and the same clutch.

When upon deenergization of the high-speed motor, the centrifugal force decreases with decreasing speed of the carrier 14, so that the fly weights 24 and 25 are gradually moved inwardly by the spring 35, the friction linings of the spring members 24a, 29a become effective slightly before one of the two clutch rollers 31, 34 can catch into one of the respective recesses 10, 11. For example, the friction lining 24b will thus be in frictional engagement with the peripheral surface of the hub 38 before the fixed clutching engagement is completed, thus securing a gradual entrainment of the catch member 9. When the belt sheave 7 has reached approximately the same speed as the carrier 14, one of the rollers 31, 34 catches into a recess 10, 11 thus reestablishing the positive driving connection between the laundering drum 20 and the motor 2 for washing operation. The laterally active friction lining of spring 29a may also be designed to remain in frictional engagement with the catch member 9 as long as the fly weight remains pivoted away from the catch member.

It will be apparent from the foregoing that a centrifugally controlled clutch according to the invention is particularly well suitable for appliances and machinery to be selectively driven from two motors of respectively different speeds. The invention, however, is also suitable for use under conditions where similar speed ratios occur although only one motor acting through transmissions of respectively different transmission ratio is involved.

To those skilled in the art it will be obvious upon a study of this disclosure that my invention permits of a variety of modifications and can be given embodiments other than particularly illustrated and described herein, without departing from the essential features of my invention and within the scope of the claims annexed hereto.

I claim:

1. A free-wheeling clutch of the centrifugal type, comprising two coaxially rotatable and selectively drivable power input members, a power output member firmly joined coaxially with one of said input members to rotate together therewith, catch means firmly joined coaxially with said other input member, entrainer means movably mounted on said one input member and engageable with said catch means for coupling said two input members together, spring means biasing said entrainer means toward engagement with said catch means, and centrifugal weight means connected with said entrainer means for moving the latter out of engagement when the speed of said one input member exceeds a given limit, whereby the clutch becomes free-wheeling relative to said other input member.

2. A free-wheeling clutch of the centrifugal type, comprising two coaxially rotatable and selectively drivable power input members, a power output member firmly joined coaxially with one of said input members to rotate together therewith, catch recess means firmly joined coaxially with said other input member, entrainer means engageable with said recess means and pivotally connected with said one input member at a point leading the catch engagement relative to the direction of rotation to be transmitted so as to effect entrainment of said other input member by pulling force, spring means biasing said entrainer means toward engagement with said catch means, and centrifugal weight means connected with said entrainer means for moving the latter out of engagement when the speed of said one input member exceeds a given limit, whereby the clutch becomes free-wheeling relative to said other input member.

3. A free-wheeling clutch of the centrifugal type, comprising two coaxially rotatable and selectively drivable power input members, a power output member firmly joined coaxially with one of said input members to rotate together therewith, a circular clutch member coaxially joined with said other input member and having catch recesses at its periphery, centrifugal means pivotally mounted on said one input member, clutch rollers mounted on said centrifugal means and engageable in said recesses, spring means biasing said centrifugal means inwardly for normally holding said rollers engaged in said recesses, whereby the clutch disengages said two input members from each other when said one input member is driven at a given minimum speed.

4. In a clutch according to claim 3, said one input member being a shaft, said output member being a belt sheave fixed on said shaft, said other input member being a belt sheave rotatable on said shaft and having a hub portion joined with said circular clutch member, a carrier structure rigidly joined with said shaft and having journal means mounted thereon and extending parallel to the axis of said shaft, said centrifugal means being pivotally mounted on said journal means.

5. A free-wheeling clutch of the centrifugal type, comprising two coaxially rotatable and selectively drivable power input members, a power output member firmly joined coaxially with one of said input members to rotate together therewith, a circular clutch member coaxially joined with said other input member and having catch recesses at its periphery, two centrifugal members movably mounted on said one input member and having respective clutch rollers of which one at a time is engageable with one of said respective recesses, said centrifugal members extending from their respective mountings to said rollers in mutually opposed directions for entrainment of said catch member by pulling force, spring means biasing said two centrifugal members inwardly for normally holding said rollers engaged in said recesses, whereby the clutch disengages said two input members from each other when said one input member is driven at a given minimum speed.

6. In a clutch according to claim 5, each of said two centrifugal members comprising a pair of parallel arms, a pivot pin fixedly joined with said one input member in parallel relation to the axis of said input members, each of the two arms of said pair having one end pivoted on said pin, said roller of each of said centrifugal members being journalled between the other arm ends of the pair.

7. A clutch according to claim 5, comprising a pivot pin fixedly joined with said one input member in parallel relation to the axis of said input members, both of said centrifugal members being pivotally mounted on said pivot pin.

8. A clutch according to claim 5, comprising two pivot pins fixedly and angularly spaced from each other, said two centrifugal members being pivotally mounted on said respective pins.

9. A clutch according to claim 5, comprising pivot means on said one input member, said centrifugal members being pivotally mounted on said pivot means, and said spring means comprising a spring seated on said pivot means and common to both said centrifugal members.

10. In a clutch according to claim 5, said other input member being a belt sheave and having a hub joined with said circular clutch member, said catch recesses being located at diametrically opposite sides of said clutch member and having each a substantially semicircular cross-sectional shape corresponding to substantially one-half of the periphery of said rollers.

11. In a clutch according to claim 5, said other input member being a belt sheave and having a hub joined with said circular clutch member, said catch recesses having respective entrainment flanks located at approximately opposite diametrical sides of said clutch member while being substantially open in the peripheral direction of non-entrainment.

12. A clutch according to claim 1, comprising an elastic friction member interposed between said centrifugal weight means and said catch means for frictionally initiating the entrainment of said catch means when the clutch transfers from free-wheeling to clutching operation.

13. With a free-wheeling clutch according to claim 1, in combination, a laundering drum, a low-speed motor for washing operation, a high-speed motor for spin-drying, a belt transmission connecting said drum with said power output member, said high-speed motor having a shaft connected with said one input member, and another belt transmission connecting said low-speed motor with said other input member.

14. With a free-wheeling clutch according to claim 1, in combination, a laundering drum, a low-speed motor for washing operation, a high-speed motor for spin-drying, said one input member being a shaft of said high-speed motor, said other input member being a first belt sheave rotatable on said shaft and having a circular coaxial extension which forms said catch means, a belt transmission connecting said first belt sheave with said low speed motor, said output member forming a second belt sheave fixed to said shaft, and another belt transmission connecting said second belt sheave with said drum, said speed limit being set so as to be exceeded when said high-speed motor is in operation for then unclutching said low-speed motor.

No references cited.